United States Patent

Yu

[11] 4,084,579
[45] Apr. 18, 1978

[54] LIGHTWEIGHT SOLAR HEATER EMPLOYING TUBES AND CHANNELS

[75] Inventor: Ying-Nien Yu, Marina del Rey, Calif.

[73] Assignee: Ying Mfg. Corporation, Gardena, Calif.

[21] Appl. No.: 695,775

[22] Filed: Jun. 14, 1976

[51] Int. Cl.² .............................................. F24J 3/02
[52] U.S. Cl. .................................. 126/271; 126/270; 165/171
[58] Field of Search ............... 126/270, 271; 237/1 A; 165/171; 248/58, 60, 62

[56] References Cited

U.S. PATENT DOCUMENTS

| 1,547,840 | 7/1925 | Steenstrup | 165/171 |
| 2,274,492 | 2/1942 | Modine | 126/271 |
| 2,281,299 | 4/1942 | Steenstrup | 165/168 |
| 2,705,948 | 4/1955 | Rostock | 126/271 |
| 3,039,453 | 7/1962 | Andrassy | 126/271 |
| 3,929,122 | 12/1975 | Aikasab | 126/271 |
| 3,972,317 | 8/1976 | Gallagher | 126/271 |
| 4,011,856 | 3/1977 | Gallagher | 165/171 X |

FOREIGN PATENT DOCUMENTS

| 938,012 | 2/1960 | United Kingdom | 126/271 |

Primary Examiner—William F. O'Dea
Assistant Examiner—Larry Jones
Attorney, Agent, or Firm—William W. Haefliger

[57] ABSTRACT

A solar collector comprises a. a multiplicity of tubes to pass fluid and to receive heat, and b. channel shaped heat transfer members having flanges, the members having webs interconnecting the flanges and presented to receive solar radiation, c. the tubes clamped between and in heat transfer contact with flanges on successive of said members to form a tube and member assembly, whereby the solar heated channel members transfer heat via the tube clamping flanges to the tubes.

8 Claims, 5 Drawing Figures

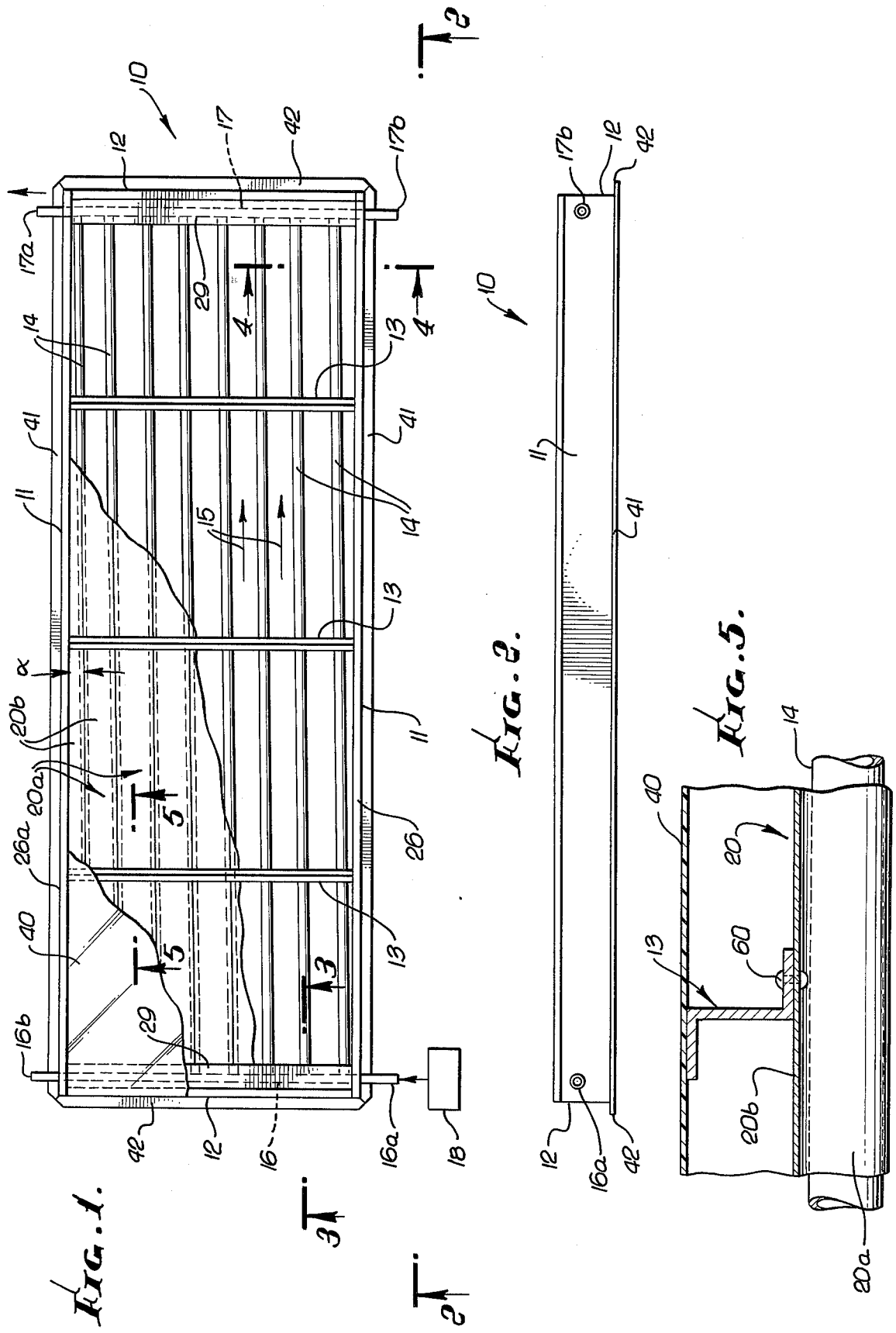

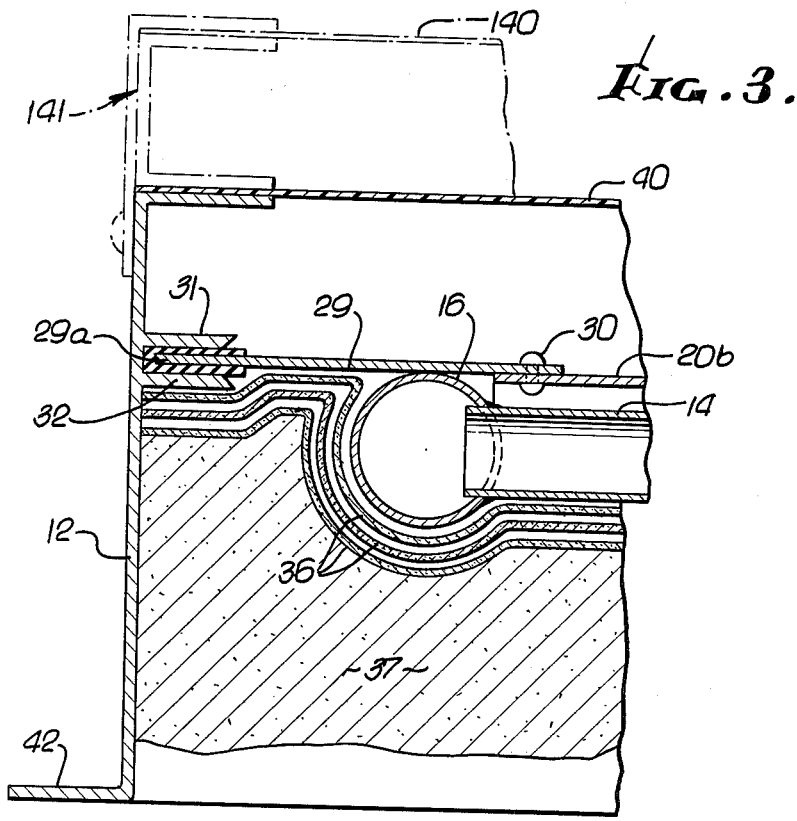
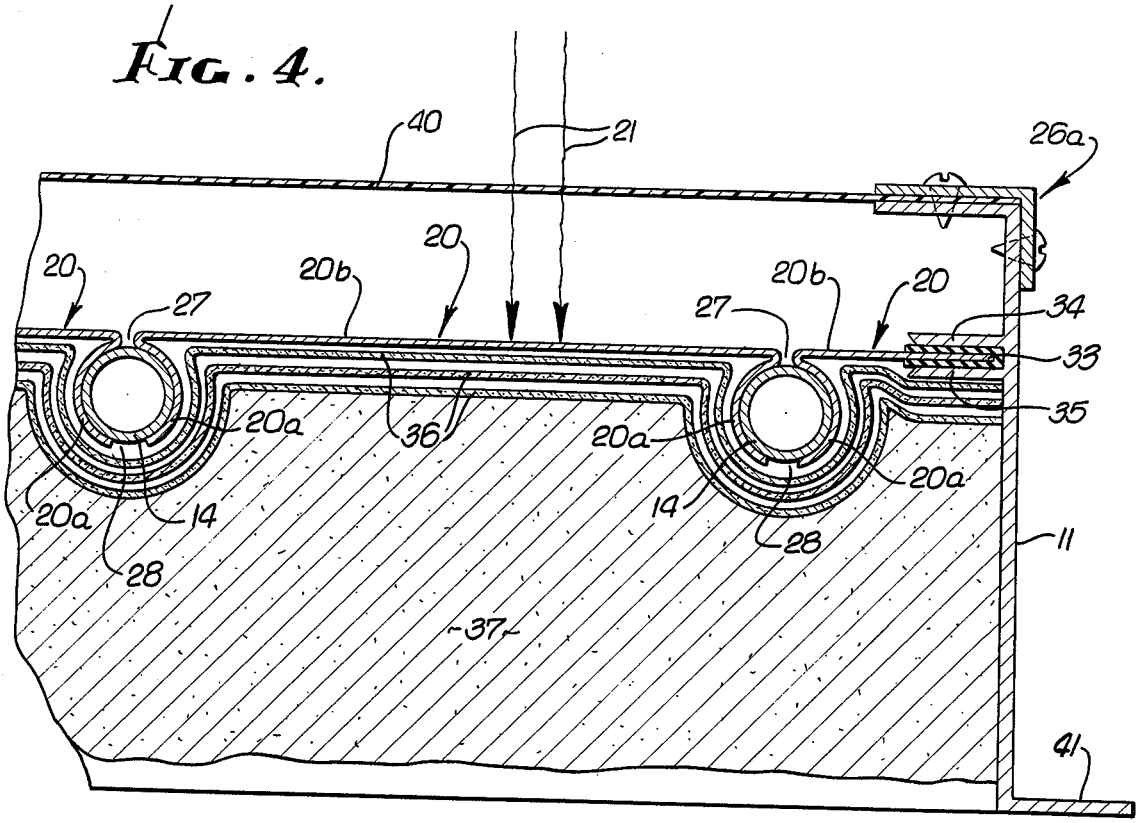

LIGHTWEIGHT SOLAR HEATER EMPLOYING TUBES AND CHANNELS

BACKGROUND OF THE INVENTION

This invention relates generally to solar heat collection, and more particularly concern a solar heat collector of highly efficient as well as easily fabricated and relatively inexpensive design, wherein solar heat is collected and transferred to flowing fluid, as for example water.

Constant efforts are currently being made to construct solar heat collector of improved design; however, none of the collectors with which I am familiar have embodied the unusual combinations of structural features, modes of operation and results as are now afforded by the present invention. These include the use of simple tubes, channels, and other members to simplify fabrication and increase efficiency.

SUMMARY OF THE INVENTION

It is a major object of the invention to provide a solar heat collector comprising an assembly of tubes, channel members and retainers which may be rapidly assembled in such clamped condition as to aid both transfer and assembly, speed fabrication, accommodate expansion and contraction, and reduce cost. Basically the collector comprises:

a. a multiplicity of tubes to pass fluid and to receive heat, and b. channel shaped heat transfer members having flanges, the members having webs interconnecting the flanges and presented to receive solar radiation, c. the tubes clamped between and in heat transfer contact with flanges on successive of said members to form a tube and member assembly, whereby the solar heated channel members transfer heat via the tube clamping flanges to the tubes.

As will be seen, retainers such as plates may be attached to the members, exerting force acting through the channel members to hold the member flanges and tubes in clamped interengagement, the flanges deflecting, yieldably, to accommodate the clamp-up assembly and to enhance heat transfer to the tubes; further, the member webs face the sun and extend throughout the area defined within a collector frame to efficiently collect solar radiation and transfer heat by conduction to the flanges for transfer to the tubes. Since the channel member may easily be formed and are inexpensive, a low-cost assembly is provided.

Further, transverse header pipes are typically provided at opposite ends of the tubes; the tubes and channel members may be angled from horizontal to aid in convection flow of heated fluid along the tubes between the header pipes; a translucent plastic sheet may be supported by the frame to overlie the radiation impingement side of the tubes and channel members; and insulative plastic such as sheeting and foam may be applied at the opposite side of the tubes and channel members, as will be described.

These and other objects and advantages of the invention, as well as the details of an illustrative embodiment, will be more fully understood from the following description and drawings, in which:

DRAWING DESCRIPTION

FIG. 1 is a front elevation of a solar collector embodying the invention;

FIG. 2 is a side view of the FIG. 1 collector or lines 2—2 of FIG. 1;

FIG. 3 is an enlarged fragmentary section on lines 3—3 of FIG. 1;

FIG. 4 is an enlarged fragmentary section on lines 4—4 of FIG. 1; and

FIG. 5 is a section on lines 5—5 of FIG. 1.

DETAILED DESCRIPTION

In the drawings, the solar collector 10 includes a box-like frame including longitudinal and horizontal side walls 11, upright transverse end walls 12, and upright transverse stiffeners 13. The latter extend between the side walls at longitudinally spaced locations.

The collector includes a multiplicity of elongated tubes 14 to pass fluid and receive heat for conduction to the fluid (such as water, for example). The tubes may advantageously be tilted at acute shallow angles α from horizontal, in order to induce endwise and upward flow of fluid in the tubes in the directions of arrows 15; further, the tubes may be parallel and transversely spaced, as shown. Typically, the tubes may consist of metal or plastic. A first header pipe 16 is located at the left ends of the tube in FIG. 1 and in communication with the tubes as via entrance of the tube left ends into the header pipe. A second header pipe 17 is located at the right ends of the tubes in FIG. 1, and is in communication with the tubes as via entrance of the tube right ends into the second header pipe. Fluid such as water supplied from a source 18 typically enters the header 16 at its lower end 16a, flows into the tubes and rightwardly and upwardly to header 17, and flows upwardly and outwardly from the header upper exit end 17a. Such flow is aided and typically occurs naturally by convection due to solar heating of the fluid in the tubes. Header pipe ends 16b and 17b may be plugged.

In accordance with an important aspect of the invention, channel shaped heat transfer members 20 are provided, the members having flanges 20a and webs 20b interconnecting the flanges. The webs are generally co-planar and face toward the sun for receiving impingement of solar radiation indicated by arrows 21 in FIG. 4. Further, the members 20 are typically metallic so as to be heat conducting, aluminum being a typical metal; accordingly, heat is quickly transferred or flows via the webs 20b to the flanges 20a for transfer by conduction to the tubes 14. The latter are clamped between and in heat transfer contact with the flanges of successive members 20, as is clear from FIG. 4, thereby to form a tube and member assembly capable of extensive solar heat collection and heat transfer to the tubes. Clamping of the tubes is facilitated by the curvature of the flanges to match the curvature of the tubes, and by the fact that the flanges yieldably deflect under clamping loading in a transverse direction, i.e. across the collector. Thus, pressure is exerted on the tubes by the flanges to aid the heat transfer thereto. Z-cross-section stiffeners 13 are attached as by rivets 60 to the webs 20b and tend to hold the members 20 and tubes in transversely clamped condition, aiding heat transfer to the tubes along substantially their entire lengths. See FIG. 5 in this regard. Note that members 20 also extend lengthwise at angles α from horizontal. The flanges 20a encompass and contact at least about 75% of the tube surface area, there being slight gaps beteen the flanges at locations 27 and 28.

Also provided are transversely extending retainers 29 attached to the members 20 at their opposite ends and exerting force acting through the members 20 to hold the flanges and tubes in transversely clamped interengagement. The retainers may advantageously comprise metal (as for example aluminum or steel) sheets or plates overlying the header pipes and attached as by rivets 30 to the webs 20b of members 20 at their opposite ends. The edges 29a of the retainer sheets 29 may be received in slots formed between flanges 31 and 32 integral with end walls 12 as seen in FIG. 3; likewise, the edges 33 of certain members 20 adjacent the side walls 11 may be received in slots formed between flanges 34 and 35 integral with side walls 11 as seen in FIG. 4. Accordingly, the entire assembly of the members 20, retainers 29 and tubes 14 is peripherally positioned by the side and end walls of the frame.

A sheet or sheets of dry plastic insulative material 36 covers the underside of the assembly at which the flanges project, and other sprayed-on plastic material 37 covers the sheet or sheets 36. The sheets 36 may consist for example of fiber glass duct liner, such as Johns Manville MICROLITE which will withstand up to about 350° F termperature; and the material 37 may consist for example of polyurethane foam.

A sheet 40 of translucent plastic material such as LEXAN may be carried by the frame side and end walls, to be spaced from the members 20 and tubes 14, as is clear from FIGS. 4 and 5. Note the brackets 26 and 26a may peripherally carry the sheet. The latter operates to pass solar radiation, and also to retain hot air between the sheet the member 20 and tube 14 assembly, providing a "green-house" effect, for higher solar collection efficiency. A second sheet 140 of material like sheet 40 may be, and supported by L-shaped bracket 141, to enhance the "green-house" effect. Sheet 140 is spaced above sheet 40.

Feet 41 and 42 are provided on the side and end walls, for stiffening and support.

Finally, it will be noted that the construction of the assembly especially accommodates differential expansion and contraction of the tubes and channels, without reducing efficiency. Thus, the tubes and channels usually of different materials (such as steel or copper tubes and aluminum channels) can differentially expand and contract lengthwise, without hindrance. The headers are carried by the tube ends so can move longitudinally therewith relative to the frame, channels and retainers, the tubes being of equal length. Widthwise expansion of the channels is accommodated by flexing of the flanges, without interfering with clamp-up.

I claim:

1. In a solar collector, the combination comprising
   a. a multiplicity of tubes to pass fluid and to receive heat, and
   b. channel shaped heat transfer members having flanges, the members having webs interconnecting the flanges and presented to receive solar radiation,
   c. the tubes clamped between and in heat transfer contact with flanges on successive of said members to form a tube and member assembly, whereby the solar heated channel members transfer heat via the tube clamping flanges to the tubes,
   d. there being retainers directly attached to certain of said members and independently of said tubes for exerting force acting through said members to hold the flanges and tubes in clamped enterengagement,
   e. there also being a first header pipe in communication with certain ends of said tubes, at least one of said retainers overlying said header pipe and attached to certain ends of said members to exert force thereon.

2. The combination of claim 1 including a second header pipe in communication with opposite ends of said tubes, and another retainer overlying said second header pipe and attached to opposite ends of said members to exert force thereon.

3. The combination of claim 2 wherein said tubes are exposed between the edges of web sides which are substantially flat and co-planar, the flanges having curvature substantially to match the tube curvature.

4. The combination of claim 3 including a frame carrying said tubes, header pipes and channel shaped members, and a translucent sheet spaced from and overlying said web sides and carried by the frame.

5. The combination of claim 4 wherein said retainers include at least one cross piece carried by the frame and extending crosswise of the tubes and members intermediate the ends thereof.

6. The combination of claim 4 including a sheet of dry plastic material covering the underside of said assembly at which said flanges project, and other plastic material sprayed onto said sheet at the side thereof opposite said assembly.

7. The combination of claim 4 wherein said frame is generally rectangular and includes elongated side strips, and said tubes are generally parallel and extend at acute angles relative to said side strips.

8. In a solar collector, the combination comprising
   a. a multiplicity of tubes to pass fluid and to receive heat, and
   b. channel shaped heat transfer members having flanges, the members having webs interconnecting the flanges and presented to receive solar radiation,
   c. the tubes clamped between and in heat transfer contact with flanges on successive of said members to form a tube and member assembly, whereby the solar heated channel members transfer heat via the tube clamping flanges to the tubes,
   d. there being retainers attached to said members and exerting force acting through said members to hold the flanges and tubes in clamped enterengagement, said retainers comprising plates forming continuations of web sides which are substantially flat and co-planar,
   e. a first header pipe in communication with certain ends of said tubes, at least one of said retainers overlying said header pipe and attached to certain ends of said members to exert force thereon, and
   f. a second header pipe in communication with opposite ends of said tubes, and another of said retainers overlying said second header pipe and attached to opposite ends of said members to exert force thereon.

* * * * *